United States Patent
Bundy (10) Patent No.: US 9,346,404 B1
(45) Date of Patent: ***May 24, 2016

(54) DECORATIVE SIDE BAR FOR A MOTOR VEHICLE

(71) Applicant: Iron Cross Automotive, Inc., Tulsa, OK (US)

(72) Inventor: Troy D. Bundy, Tulsa, OK (US)

(73) Assignee: Iron Cross Automotive, Inc., Tulsa, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,695

(22) Filed: Sep. 9, 2014

Related U.S. Application Data (63) Continuation of application No. 14/171,351, filed on Feb. 3, 2014, now Pat. No. 8,827,293, which is a continuation of application No. 12/942,769, filed on Nov. 9, 2010, now Pat. No. 8,641,068.

(51) Int. Cl.
*B60R 3/00* (2006.01)

(52) U.S. Cl.
CPC ...................................... *B60R 3/002* (2013.01)

(58) Field of Classification Search
CPC .......... B60R 3/00; B60R 3/002; B60R 3/007; B60R 3/02; B60R 3/04; B60R 9/02
USPC ............................ 280/163, 164.1, 164.2, 169
See application file for complete search history.

(56) References Cited

U.S. PATENT DOCUMENTS

| | | | |
|---|---|---|---|
| 5,511,750 A | 4/1996 | Evenson | |
| 5,769,439 A * | 6/1998 | Thompson | 280/163 |
| 5,895,064 A | 4/1999 | Laubach | |
| 6,412,799 B1 | 7/2002 | Schrempf | |
| 6,533,302 B2 | 3/2003 | Scruggs et al. | |
| 6,581,946 B2 * | 6/2003 | Lund | B60R 3/002 280/163 |
| 6,588,783 B2 | 7/2003 | Fichter | |
| 6,742,793 B2 * | 6/2004 | Henriksen | B60R 3/002 280/163 |
| 6,874,801 B2 | 4/2005 | Fichter | |
| 7,083,179 B2 | 8/2006 | Chapman et al. | |
| D535,928 S | 1/2007 | Crandall | |
| 7,287,770 B2 | 10/2007 | Drabant et al. | |
| D567,729 S | 4/2008 | Crandall | |
| 7,360,779 B2 | 4/2008 | Crandall | |
| 7,416,202 B2 | 8/2008 | Fichter | |
| 7,461,852 B2 * | 12/2008 | Richardson et al. | 280/163 |
| 7,677,583 B2 | 3/2010 | Armstrong et al. | |
| 7,717,444 B2 | 5/2010 | Fichter | |

(Continued)

FOREIGN PATENT DOCUMENTS

DE 4217551 * 7/1993

*Primary Examiner* — Katy M Ebner
*Assistant Examiner* — Emma K Frick
(74) *Attorney, Agent, or Firm* — GableGotwals (57) ABSTRACT

A side bar made according to this invention includes a rail that forms a channel which receives mounting means such as a clip for securing the rail to a desired mounting point. The clip is moveable along the channel to any vehicle or step mounting point desired. Once in its desired location, the clip helps to secure the rail to the mounting bracket. When the rail is secured to a vehicle frame, the rail hides the vehicle mounting brackets from view and, when fully assembled with a step, hides any step mounting bracket from view. Because the mounting brackets are not visible, and because the step is complementary in shape to the rail, the rail gives the appearance of supporting the step.

7 Claims, 7 Drawing Sheets

(56) References Cited

U.S. PATENT DOCUMENTS

| | | |
|---|---|---|
| 7,731,212 B2 | 6/2010 | Storer |
| 7,909,344 B1 | 3/2011 | Bundy |
| 7,946,604 B2 | 5/2011 | Crandall |
| 8,152,187 B1 | 4/2012 | Crandall |
| 8,342,550 B2 | 1/2013 | Stickles et al. |
| 8,403,348 B1 | 3/2013 | Wang |
| 8,448,967 B2 * | 5/2013 | Storer .......................... 280/163 |
| 8,657,318 B2 | 2/2014 | Chen |
| 2007/0085376 A1 | 4/2007 | Kuntze et al. |
| 2011/0181012 A1 | 7/2011 | Storer |
| 2012/0104718 A1 | 5/2012 | Alvarez |
| 2012/0228848 A1 | 9/2012 | Fichter |

* cited by examiner

DECORATIVE SIDE BAR FOR A MOTOR VEHICLE

CROSS-REFERENCE TO RELATED APPLICATIONS

This application claims priority to, and the benefit of, U.S. patent application Ser. No. 14/171,351 filed on Feb. 3, 2014, which is herein incorporated by reference and which in turn claimed priority to U.S. patent application Ser. No. 12/942,769 filed on Nov. 9, 2010 and issued as U.S. Pat. No. 8,641,068 on Feb. 4, 2014 which, in turn, claimed priority to U.S. patent application Ser. No. 12/147,641, filed Jun. 27, 2008.

BACKGROUND OF THE INVENTION

The present invention relates generally to the field of vehicle accessories and, more particularly, to automotive side bars with adjustable vehicle steps for assisting entry into high road clearance vehicles.

Vehicle steps of various types are on the market as aftermarket accessories. One of the problems with currently available vehicle steps is that they are one piece devices that are not adjustable as to where longitudinally on the vehicle the step must be attached. Also, the currently available vehicle steps do not allow for easy attachment of multiple or additional steps along the side of the vehicle. Further, currently available steps do not allow the user to select from various widths and heights of steps that can be used together on a vehicle. Additionally, most of the steps currently available secure the step assembly to the decorative side bar. The side bar is often too weak to support the force exerted on the step assembly when stepped upon by a heavy person.

An object of the present invention is to provide a side bar that allows a vehicle step to be positioned at any point desirable along the length of the side bar. Another object of this invention is to provide a side bar that can accommodate multiple step assemblies. A further object of this invention is to provide a side bar that can accommodate step assemblies of different heights and widths in order to meet the needs and desires of the consumer and to match the dimensions of the vehicle on which the step is to be employed. Yet another object of this invention is to provide a side bar with adequate mounting support for the step when the step is under load. Still yet another object of this invention is to provide side bar that hides the mounting structure from view and gives the appearance that the step is being supported by the decorative rail of the side bar.

SUMMARY OF THE INVENTION

A side bar made according to this invention includes a decorative rail that forms an open channel and is mounted to the frame of a high road clearance motor vehicle such as a pick-up truck or a motor home. The channel receives mounting means such as a clip that may be positioned at any point along the rail where a step is desired to be mounted. The clip receives the fastening means for securing the rail to the mounting bracket for the step. The clip may also receive fastening means for a bracket used to secure the rail to the vehicle frame. Preferably, the step mounting bracket is secured to the rail in combination with the vehicle mounting bracket. However, there is no requirement for such a pairing. Because the rear wall portion of the channel forms a slot, it prevents the clip from exiting the channel rearward when the rail is secured to the mounting bracket. A step, which preferably has a shape complementary to the rail, may then be secured to the bracket. The rail and step combine to hide the bracket from view, thereby giving the appearance that the step is supported by the rail.

BRIEF DESCRIPTION OF THE DRAWINGS

FIG. 2 is a view of the side bar taken along section line 2-2 of FIG. 1. The decorative rail may be any shape preferable but forms a channel that has a slot running lengthwise between each end. The slot receives a clip that is moveable within the channel to a desired mounting point. The clip, in turn, receives a fastener used to secure the rail to the step mounting bracket and, preferably, the step mounting bracket to the vehicle mounting bracket.

FIG. 3 is a view of the side bar taken along section line 3-3 of FIG. 2. In the secured and fastened position, the brackets and clip are drawn tightly against the slotted rear wall portion of the channel. A step, which is mounted to the horizontal portion of the step mounting bracket, hides this portion of the bracket from view and gives the appearance that the decorative rail is supporting the step.

FIG. 6 is an exploded bottom view of the side bar of FIG. 5. A recessed portion on the underside of the step in combination with the lower front edge of the step serves to hide the horizontal portion of the mounting bracket from view.

DETAILED DESCRIPTION OF THE PREFERRED EMBODIMENTS

Preferred embodiments of side bar for a motor vehicle will now be described by making reference to the following elements illustrated in the drawings:

| | |
|---|---|
| 10 | Side bar |
| 20 | Decorative rail |
| 21 | Upper wall surface of 22 |
| 22 | Front wall |
| 23 | Lower wall surface of 22 |
| 24 | Channel |
| 26 | Slot |
| 28 | Rear wall |
| 30 | First end |
| 31 | End cap |
| 32 | Second end |
| 34 | Clip |
| 36 | Bolt |
| 38 | Nut |
| 40 | Vehicle mounting bracket |
| 42 | Vertical run |
| 46 | Bolt |
| 50 | Step mounting bracket |
| 52 | Vertical run |
| 54 | Horizontal run |
| 56 | C-channel |
| 60 | Step |
| 62 | Rear wall surface |
| 64 | Top wall surface |
| 66 | Bolt |
| 68 | Nut |
| 70 | Landing area for a user's foot |
| 72 | Front wall surface |
| 74 | Bottom surface/recessed portion |

Figure 1:
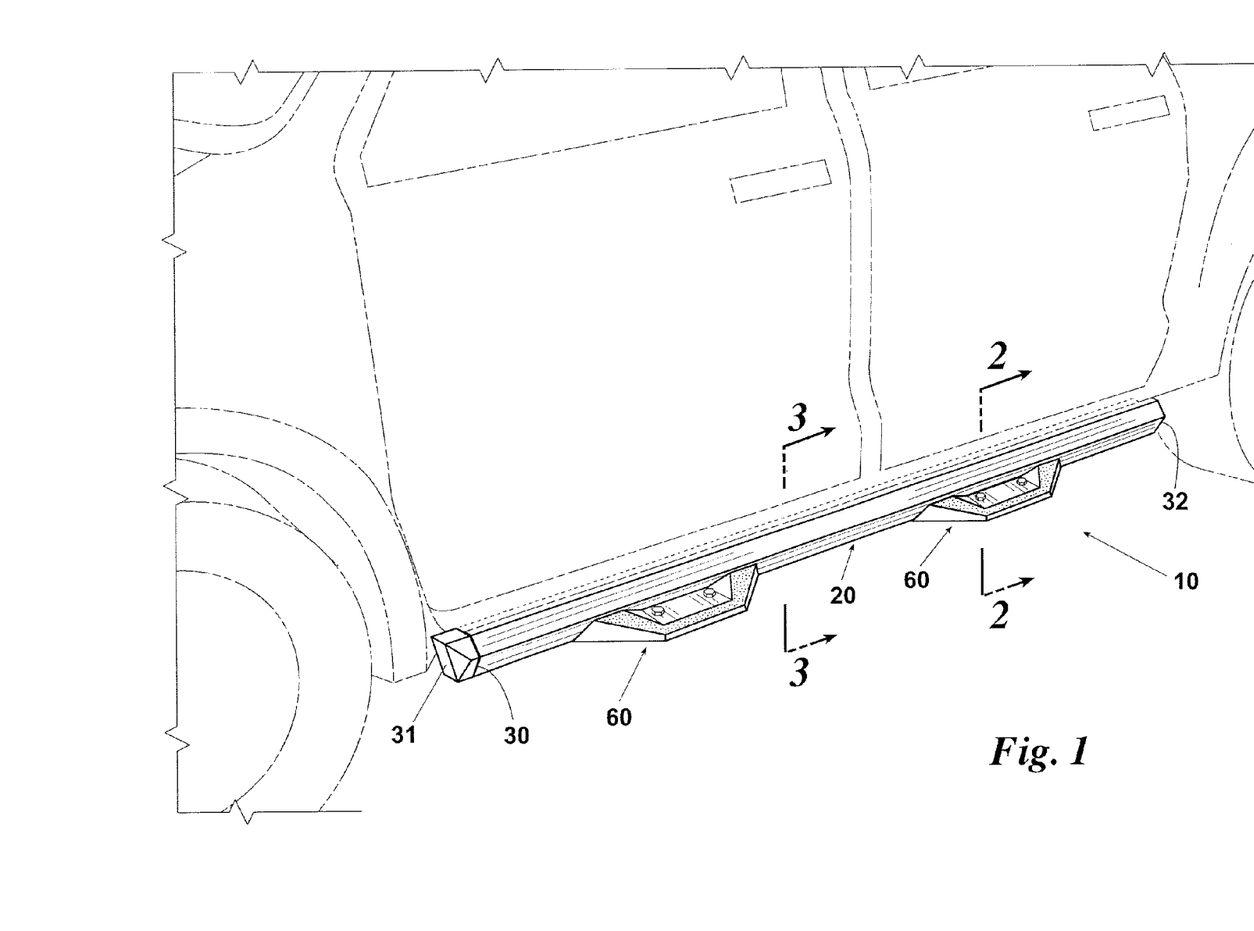
FIG. 1 is a view of a preferred embodiment of a side bar made according to this invention and installed on a motor vehicle. The decorative rail of the side bar conceals from view the brackets used to mount the side bar to the vehicle as well as the horizontal portion of the brackets used to secure each step in position forward of the rail.
Figure 2:
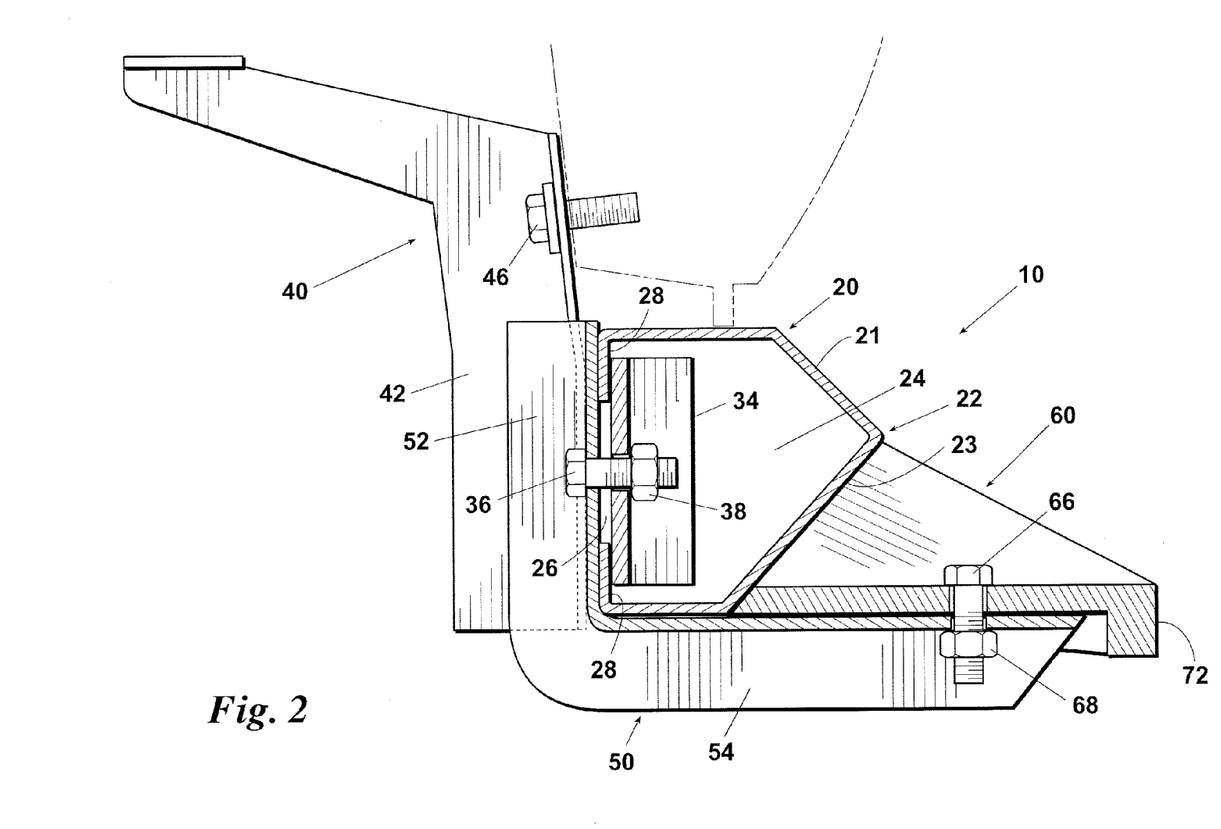
Figure 3:
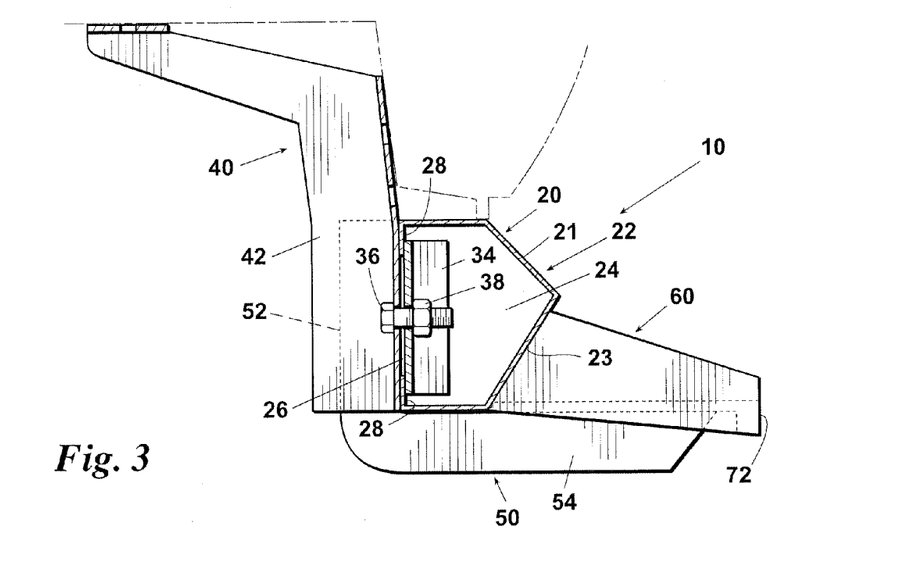
Figure 5:
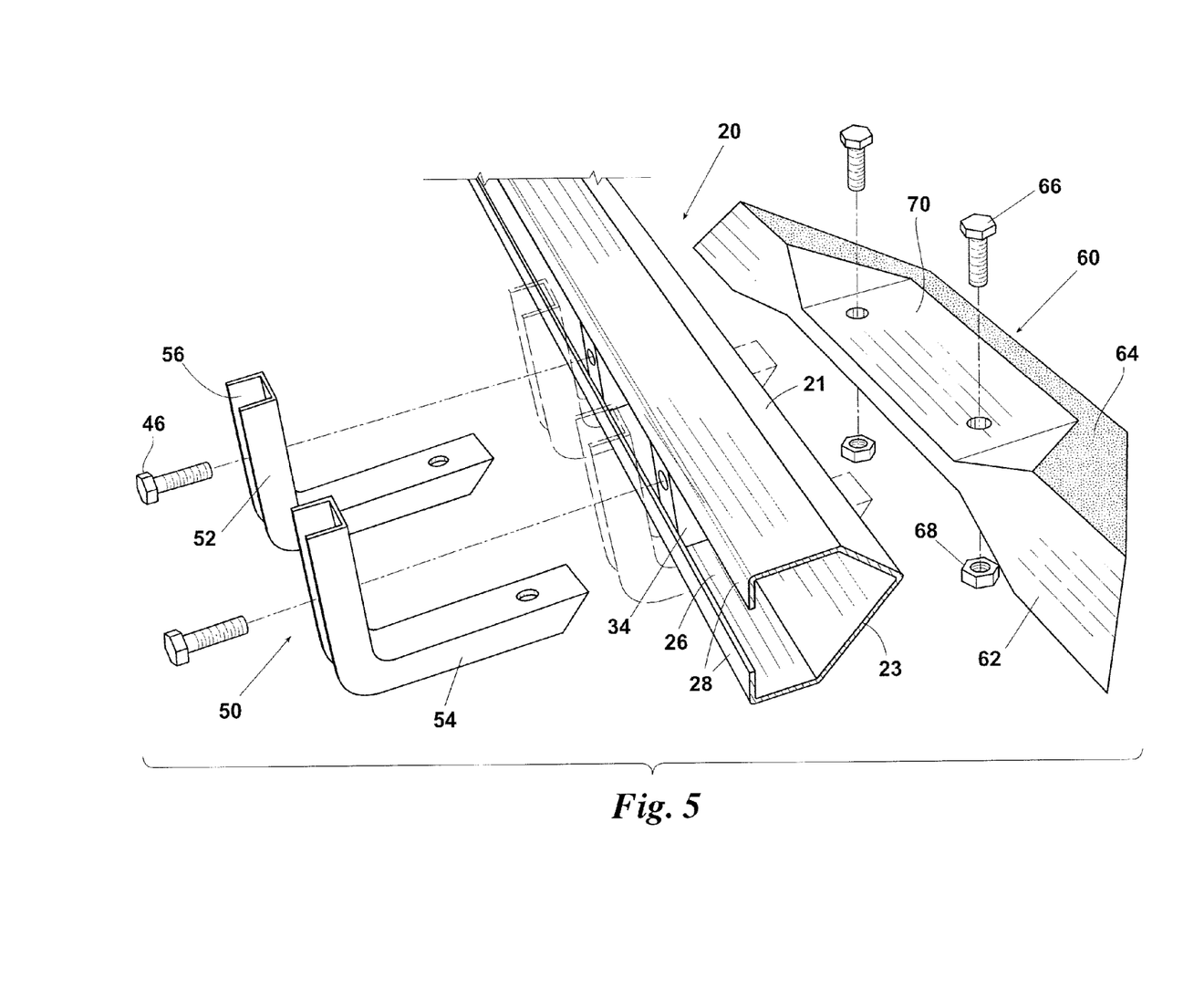
FIG. 5 is an exploded view of the side bar of FIG. 1 and illustrates the attachment of one step to the decorative rail. The vehicle mounting bracket is not shown. Because the clip is moveable within the channel to a desired mounting point, the step may be positioned and mounted at any place preferable along the rail.
Figure 6:
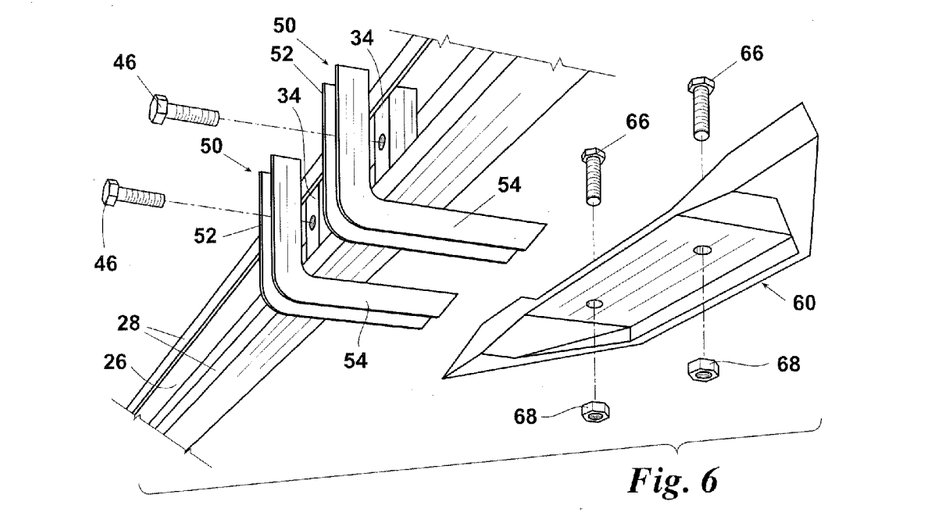
Figure 7:
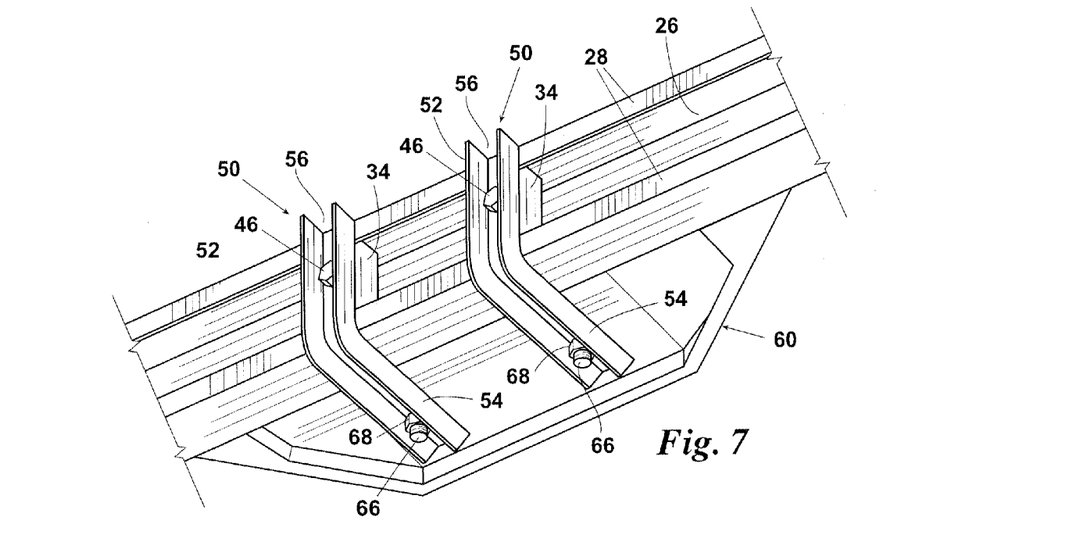
FIG. 7 is an assembled bottom view of the side bar of FIG. 5.
Figure 8:
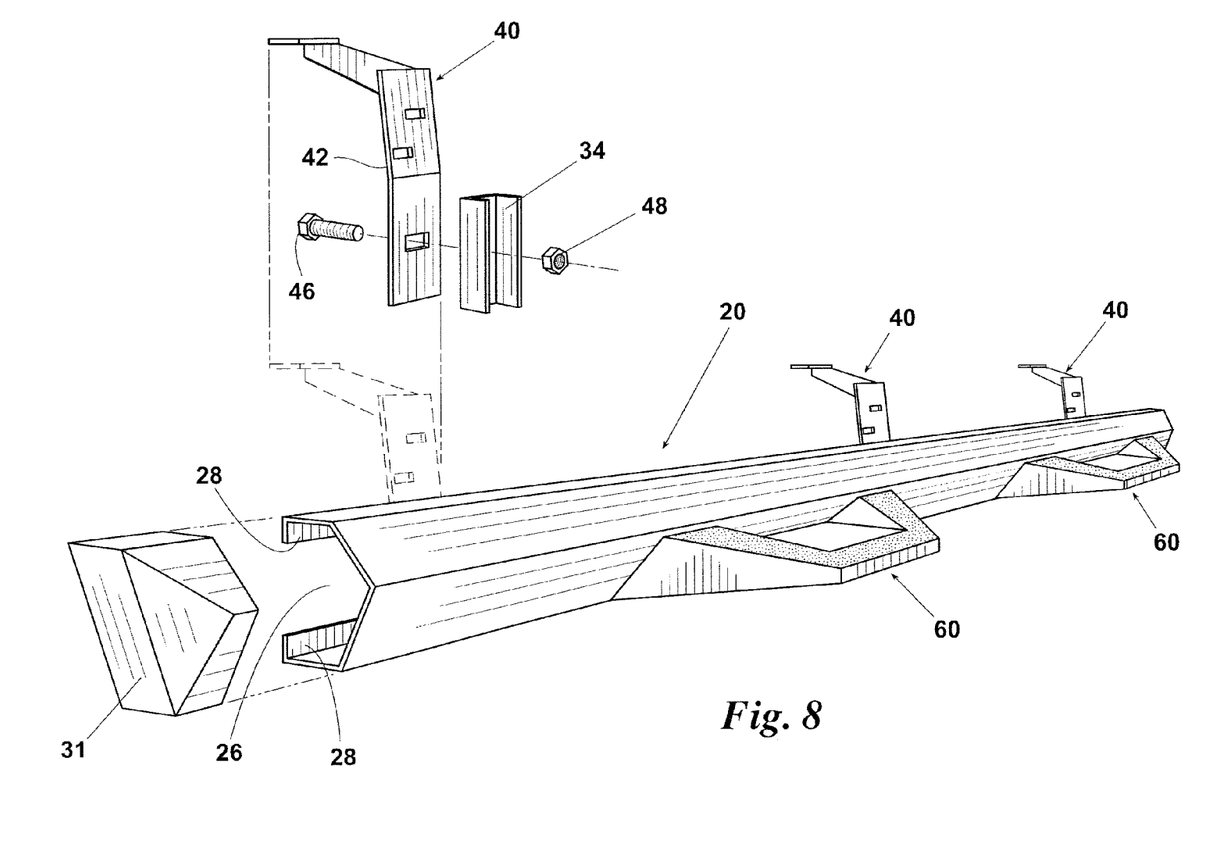
FIG. 8 is an exploded view of the side bar of FIG. 1 and illustrates the vehicle mounting brackets being positioned at any place required or preferable along the decorative rail. The vehicle mounting bracket may be used alone or in combination with the step mounting bracket (see e.g., FIG. 2).

Referring to the drawings and first to FIGS. 1-3, a preferred embodiment of a side bar 10 made according to this invention includes a decorative rail 20 that, when installed on a motor vehicle, hides from view the vehicle mounting brackets 40 used to connect the side bar 10 to the frame or body of the motor vehicle and a vertical run 52 of the step mounting brackets 50 used to secure a step 60 forward of the rail 20 at a desired location along the rail 20. Vehicle mounting bracket 40, which is preferably an L- or hockey-stick-shaped bracket, is secured to the frame of the vehicle using an appropriate fastener such as one or more bolts 46. Step mounting bracket 50, which is also preferably an L-shaped bracket, is secured to one of the vehicle mounting brackets 40 to provide effective support for step 60 when under load. In a preferred embodiment, step mounting bracket 50 includes a c-channel 56 that receives the vertical run 42 of vehicle mounting bracket 40 (see FIGS. 5-7) and places the vertical runs 42, 52 of each mounting bracket 40, 50 in communication with one another so that, when secured to one another, bracket 40 provides added support to the step mounting bracket 50 and prevents or limiting any side-to-side (or rotational) movement of step mounting bracket 50.

Figure 4:
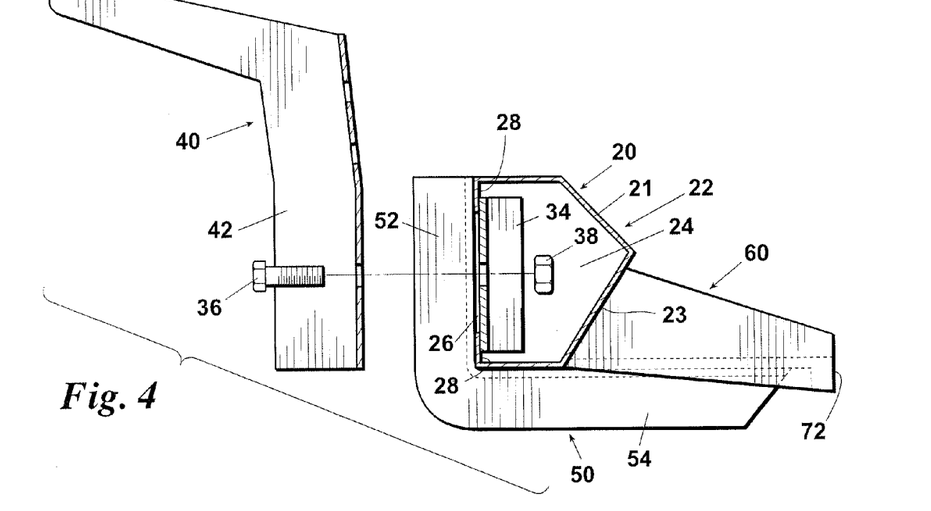
FIG. 4 is an exploded view of the side bar of FIG. 1 and illustrates the preferred means of securing together the vehicle mounting bracket, the step mounting bracket, and the decorative rail. The clip, which is preferably U-shaped, is sized so as to be easily inserted through the slot and into the channel formed by the decorative rail when oriented parallel to the slot but captured by the rear wall of the channel and prevented from escaping when oriented perpendicular to the slot.
Figure 9:
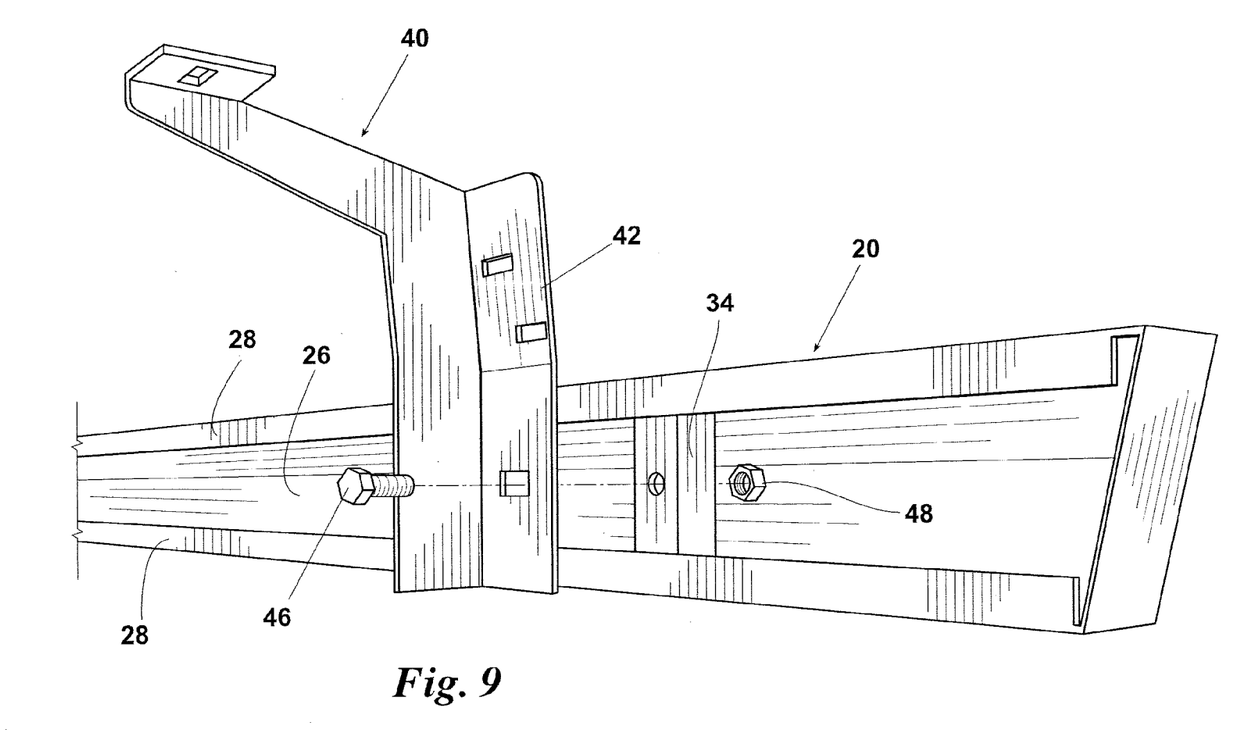
FIG. 9 is an exploded rear view of the vehicle mounting bracket of FIG. 1 and its relationship to the clip and decorative rail. The step mounting bracket is not shown.

Decorative rail 20, which may have a salt-box style front wall 22 which together with the rear wall 28 forms a hollow interior rail (space or channel 24). The channel 24 has a lengthwise slotted portion or slot 26 running along the rear wall 28 of the rail 20 and extending between the first and second ends 30, 32 of the rail 20. An end cap 31 may be used to cap each end 30, 32 of the rail 20. Slot 26 receives a clip 34 for helping to secure rail 20 to the mounting brackets 40, 50 alone (see e.g., FIGS. 6 & 9) or in combination (see e.g. FIGS. 2-4). Clip 34 is inserted through slot 26 into channel 24 and moved to any mounting point desirable along the length of the rail 20. The slot 26 and clip 34 are sized relative to one another so that when clip 34 is oriented substantially parallel to slot 26, the clip 34 passes through the slotted portion 26 into (or out of) channel 24, but when clip 34 is oriented substantially perpendicular to slotted portion 26, the clip 34 is prevented from passing through the slotted portion 26. Once clip 34 is positioned at the intended mounting point, a threaded bolt 36 is passed through the bracket 40 or 50 (or both) and through clip 34. A nut 38 receives threaded bolt 36. Although shown as a separate component, nut 38 may be integral to clip 34. As the threaded bolt 36 and nut 38 are tightened, clip 34 draws tightly against the rear wall 28 above and below slot 26 and secures the rail 20 to the brackets 40, 50.

Step 60 provides a planar landing area 70 for a foot of a user stepping onto the step 60 to gain access to the vehicle. Step 60 is secured by appropriate fasteners, such as bolts 66 and nuts 68, to the horizontal run 54 of step mounting bracket 50. Preferably, step 60 is shaped complementary to the decorative rail 20 so that when step 60 is secured to step mounting bracket 50, step 60 gives the appearance of being connected to and supported by the rail 20. Note that side bar 10 allows for different types, widths, and heights of step 60 to be used in a single vehicle application and could be sized to directly support step 60. Furthermore, because of the mounting arrangement provided by brackets 40, 50 and clip 34, the rail 20 or step 60 may be easily replaced if damaged.

In a preferred embodiment, step 60 has an upward sloping top wall surface 64 that merges or blends into the sloping upper wall surface 21 of the front wall 22 of rail 20 and a downward sloping rear wall surface 62 that runs substantially parallel to the opposing lower wall surface 23 of front wall 22. The front wall surface 72 may extend below the bottom surface 74 of the step 60 in order to hide the horizontal run 54 of step mounting bracket 50 from view.

While a side bar for a motor vehicle has been described with a certain degree of particularity, many changes may be made in the details of construction and the arrangement of components without departing from the spirit and scope of this disclosure. A side bar made and used according to this disclosure, therefore, is limited only by the scope of the attached claims, including the full range of equivalency to which each element thereof is entitled.

What is claimed is:

1. A motor vehicle side bar for installation on a motor vehicle below a rocker panel of the motor vehicle, the motor vehicle side bar comprising:
   a decorative rail sized to span substantially an entire longitudinal length of the rocker panel, the decorative rail including a front wall, a rear wall spaced apart from the front wall, and a hollow interior formed by and between the front and rear walls, a top and a bottom portion of the rear wall being spaced apart from one another to form a longitudinally extending slot of the rear wall to provide access into and along the hollow interior;
   a mounting means positionable within the slot and the hollow interior space of the decorative rail and arranged to connect the decorative rail to a mounting bracket that is arranged to mount the decorative rail to a desired mounting location on the motor vehicle; and
   at least one step being a separate structure apart from the decorative rail and positionable to a desired mounting location relative to the decorative rail;
   wherein the step contacts the front wall of the decorative rail when the side bar is in an assembled state.

2. A motor vehicle side bar according to claim 1 wherein in the assembled state the step is not supported by the decorative rail.

3. A motor vehicle side bar according to claim 2 further comprising a mounting bracket connected to the step.

4. A motor vehicle side bar according to claim 1 wherein the slot extends the entire length of the decorative rail.

5. A motor vehicle side bar according to claim 1 further comprising the mounting means being a clip.

6. A motor vehicle side bar according to claim 5 further comprising the slot having a width less than that of the clip.

7. A motor vehicle side bar according to claim 5 further comprising the slot having a width less than a length of the clip.

\* \* \* \* \*